3,225,041
PROCESS FOR PRODUCING 2,6-DIAMINO
PYRIDINES
Francis Johnson, Newton Lower Falls, Mass., assignor to
The Dow Chemical Company, Midland, Mich., a corporation of Delaware
No Drawing. Filed Dec. 12, 1962, Ser. No. 243,994
8 Claims. (Cl. 260—247.5)

The present invention is directed to a process for the direct synthesis of 2,6-diaminopyridines.

It is an object of this invention to provide a process for the direct synthesis of 2,6-diaminopyridines.

I discovered that 2,6-diaminopyridines are produced by reacting a primary or secondary amine with a 3-hydroxyglutaronitrile (I) or a glutacononitrile (II), in the presence of a halogen acid as follows:

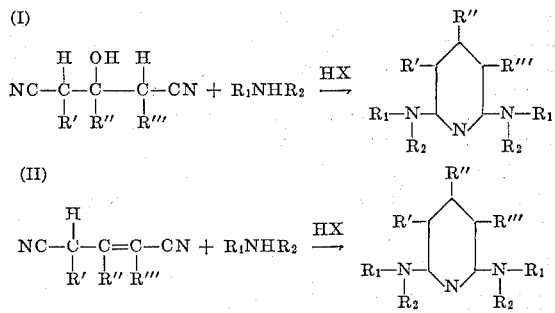

wherein R may be any organic or inorganic radical which is stable under the reaction conditions.

The primary and secondary amines useful in my process are those stable to the reaction conditions and generally include those amines having the formula $R_1NHR_2$, wherein $R_1$ and $R_2$ are aliphatic and aromatic radicals including substituted radicals and are preferably lower alkyl and mono- and bicyclic aryl radicals. The R groups may be cyclized to form amines such as cyclohexylamine and morpholine. $R_2$ is hydrogen when the amine is a primary amine.

The 3-hydroxyglutaronitriles and the glutacononitriles useful in my process have the formula specified hereinbefore. R', R'', and R''' may broadly be any substituting group which is stable under the reaction conditions. These include such groups as alkoxy and aryloxy, and hydrocarbons including substituted hydrocarbons. They are preferably hydrogen; lower alkyl, such as methyl, ethyl, butyl, octyl, benzyl and methylbenzyl; and monocyclic aryls. Adjacent R groups may be cyclized to form ring, fused and bridged structures. When the glutacononitrile reactant is used, the adjacent R'' and R''' groups may be cyclized to form a monocyclic aryl having the following structure:

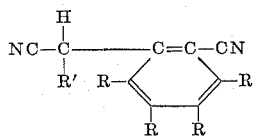

wherein the R substituents are preferably hydrogen or lower alkyls. The cyclized reaction product formed using this type of 2-cyanobenzyl cyanamide are 1,3-diaminoisoquinolines. These 1,3-diaminoisoquinolines are a species of the 2,6-diaminopyridines substituted in the 4 and 5 positions, and are meant to be included by the term "2,6-diaminopyridines."

The cyclization reaction is carried out using a halogen acid, (hydrogen chloride, hydrogen bromide or hydrogen iodide) as a catalyst. Hydrogen bromide and hydrogen iodide are preferred. The amount of the hydrogen halide present can vary as it is a catalyst; preferably at least $\frac{1}{100}$ of a mole based on the reactants is preferred.

The reaction is carried out by mixing the dinitrile with the amine at temperatures from about 0° to 200° C. The temperatures of reaction should not be above the decomposition temperatures of any of the reactants. The reaction proceeds slowly at room temperature and more rapidly at the higher temperatures which are preferred. Atmospheric conditions are utilized. The ratio of amine reactant to the dinitrile reactant should be at least 2:1 to comply with the stoichiometry. Excess amine is not harmful and may be useful as a solvent.

For the purpose of giving those skilled in the art a better understanding of the invention, the following illustrative examples are given:

*Example 1*

3-hydroxyglutaronitrile (0.1 mole) and aniline (0.2 mole) were mixed with aniline hydrobromide (0.1 mole) and the mixture heated at 180° for 5 hours. The mixture was poured into sodium hydrogen carbonate solution and the mixture extracted with methylene chloride. Removal of the methylene chloride gave a yellow-red gum which was chromatographed over alumina. Ether eluted 2,6-bis(N-anilino)pyridine which when recrystallized from ether-petrol ether (B.P. 30–60°) gave pure 2,6-bis(N-anilino)pyridine.

*Example 2*

1,3-dicyanopropene was used in place of the 3-hydroxyglutacononitrile of Example 1 to produce the same product.

*Example 3*

Using the procedure of Example 1, 0.05 mole of 3-hydroxyglutacononitrile was reacted with 0.17 mole of morpholine in the presence of 0.004 mole of hydrogen bromide at 125° for five hours. 2,6-bis(N-morpholino)pyridine, M.P. 98–99° C., was obtained.

In each of the examples tabularized below, the amine of column 2 is reacted with the dicyanonitrile of column 3, in a mole ratio of 2:1, under the conditions of Examples 1 and 3.

TABLE I

| Example No. | Amine | Dicyano-compound |
|---|---|---|
| 4 | Napthylamine | 1,3-dicyano-1-butylpropanol-2. |
| 5 | 2-chloroaniline | 1,3-dicyanopropene. |
| 6 | Dioctylamine | 1,3-dicyano-2-phenylpropanol-2. |
| 7 | Aniline | 2-cyanobenzyl cyanide. |
| 8 | Ethylamine | 1,3-dicyano-2,3-diethylpropene-2. |
| 9 | Benzylamine | α-benzyl-2-cyanobenzyl cyanide. |

Similar products are obtained utilizing hydrogen chloride and hydrogen iodide in place of the hydrogen bromide of the foregoing examples. The amines listed in Table II may each be reacted with a dinitrile from Table III, in accordance with the procedure of the previous examples, to prepare 2,6-diamino pyridines and 1,3-diaminoisoquinolines.

TABLE II

Aniline, 2-chloroaniline, morpholine, monoethylamine, benzylamine, isopropylamine, diisopropylamine, naphthylamine, diethylamine and dioctylamine.

TABLE III 1,3-dicyanopropanol-2,
1,3-dicyano-2-methylpropanol-2,
1,3-dicyanopropene,
1,3-dicyano-2-phenylpropanol-2,
1,3-dicyano-2-ethylpropanol-2,
1,3-cyanobenzyl cyanide,
α-benzyl-2-cyanobenzyl cyanide,
α-(2-phenylethyl)-2-cyanobenzyl cyanide,
α-(p-tolyl)-2-cyanobenzyl cyanide,
1,3-dicyano-1-butylpropanol-2
1,3-dicyano-2,3-diethylpropene-2,
1,3-dicyano-1-methoxypropene-2,
1,3-dicyano-2-nitropropanol-2,
1,3-dicyano-2-nitrosoprene-2,
1,3-dicyano-2-cyclohexylpropene-2,
1,3-dicyano-1-p-chlorophenylpropene-2.

As many embodiments of this invention may be made without departing from the spirit and scope thereof, it is to be understood that the invention includes all such modifications and variations as come within the scope of the appended claims.

What is claimed is:

1. The process for preparing 2,6-diaminopyridines comprising reacting at a temperature between 0° C. and 200° C. and in the presence of a hydrogen halide catalyst,
   (i) an amine selected from the group consisting of morpholine and amines having the formula $R_1NHR_2$ wherein $R_1$ and $R_2$ are selected from the group consisting of lower alkyl benzyl, phenyl, halophenyl and naphthyl radicals, and $R_2$ may also be hydrogen; with a
   (ii) dinitrile selected from the group consisting of dinitriles having the formula

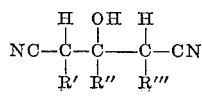

and

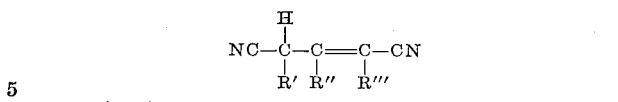

wherein R′, R″, and R‴ are each selected from the group consisting of hydrogen, lower alkyl, benzyl, phenyl, lower alkylphenyl, and halophenyl.

2. The process of claim 1 in which the R substituents on the dinitrile are all hydrogen.

3. The process of claim 1 in which the amine and dinitrile are reacted at an elevated temperature below 200° C.

4. The process for preparing 2,6-bis(N-anilino)pyridine comprising reacting at a temperature between 0° C. and 200° C. and in the presence of a hydrogen bromide catalyst, aniline with 3-hydroxyglutaronitrile.

5. The process for preparing 2,6-bis(N-anilino)pyridine comprising reacting at a temperature between 0° C. and 200° C. and in the presence of a hydrogen bromide catalyst, aniline with 1,3-dicyanopropene.

6. The process for preparing 2,6-bis(N-morpholino)-pyridine comprising reacting at a temperature between 0° C. and 200° C. and in the presence of a hydrogen bromide catalyst, 3-hydroxyglutaronitrile with morpholine.

7. The process for preparing 2,6-bis[N-(2-chloro)-anilino]pyridine comprising reacting at a temperature between 0° C. and 200° C. and in the presence of a hydrogen bromide catalyst, 1,3-dicyanopropene with 2-chloroaniline.

8. The process for preparing 1,3-bis(N-anilino)isoquinoline comprising reacting at a temperature between 0° C. and 200° C. and in the presence of a hydrogen bromide catalyst, aniline with 2-cyanobenzyl cyanide.

References Cited by the Examiner
UNITED STATES PATENTS
3,096,337   7/1963   Johnson _____ 260—296

WALTER A. MODANCE, *Primary Examiner.*
NICHOLAS S. RIZZO, *Examiner.*